United States Patent [19]

Shirai et al.

[11] Patent Number: 4,819,778

[45] Date of Patent: * Apr. 11, 1989

[54] ENGAGEMENT DEVICE FOR AN ELECTROMAGNETIC SPRING-WOUND CLUTCH

[75] Inventors: Isamu Shirai; Susumu Ujiie, both of Isesaki; Takeshi Koitabashi, Annaka, all of Japan

[73] Assignee: Sanden Corporation, Isesaki-Shirai, Japan

[ * ] Notice: The portion of the term of this patent subsequent to Oct. 28, 2003 has been disclaimed.

[21] Appl. No.: 637,799

[22] Filed: Aug. 6, 1984

[30] Foreign Application Priority Data

Aug. 6, 1983 [JP] Japan ............................. 58-144317

[51] Int. Cl.⁴ ............................................. F16D 27/10
[52] U.S. Cl. ..................................... 192/84 T; 192/35
[58] Field of Search ................ 192/84 C, 106.1, 84 T, 192/81 C, 35

[56] References Cited

U.S. PATENT DOCUMENTS

| | | | |
|---|---|---|---|
| 3,044,594 | 7/1962 | Bernard | 192/84 |
| 3,735,847 | 5/1973 | Brucken | 192/35 |
| 4,194,607 | 3/1980 | Yamaguchi | 192/84 T |
| 4,225,027 | 9/1980 | Takefuta et al. | 192/84 T |
| 4,619,351 | 10/1986 | Takatoshi | 192/35 |

FOREIGN PATENT DOCUMENTS 195932 12/1982 Japan ............................. 192/84 T

*Primary Examiner*—Rodney H. Bonck
*Assistant Examiner*—David A. Testardi
*Attorney, Agent, or Firm*—Banner, Birch, McKie & Beckett

[57] ABSTRACT

An electromagnetic spring-wound clutch is disclosed. An armature plate member to which one end of a coil wound spring is connected is flexibly connected to a guide member rotatably supported on a cover plate by a plurality of leaf springs. The cover plate has a bent portion at its axial terminal end and the guide member is closely fitted against the bent portion to maintained its axial position thereon. Thus, the armature plate is fitted against an axial end of the bent portion due to the recoil strength of the coil wound spring.

4 Claims, 2 Drawing Sheets

ENGAGEMENT DEVICE FOR AN ELECTROMAGNETIC SPRING-WOUND CLUTCH

BACKGROUND OF THE INVENTION

The present invention relates generally to the field of electromagnetic clutches, and more particularly, is directed to an improved engagement device for an electromagnetic spring-wound clutch.

Electromagnetic spring-wound clutches which may be used to couple a compressor to a prime mover are well known. For example, U.S. Pat. No. 3,735,847 to Brucken discloses the basis construction of an electromagnetic spring-wound clutch. The conventional spring-wound clutch comprises a coaxial input member on which an annular armature plate is rotatably provided along with an output member. A coil-wound spring is wound around the input member and is connected at its respective ends to the armature plate and output member. An electromagnetic coil, which is coaxially disposed in the input member with a small gap therebetween, attracts the armature plate into frictional engagement with the input member, thereby causing the coil-wound spring to be tightly wound around the input member and thus drivably engaging the input member with the output member. When the coil is de-energized, the armature plate disengages from the input member and is returned to a predetermined position due to the magnetic force of a permanent magnet attached to the armature plate. The coil-wound spring releases the input member from rotation relative to the output member.

In conventional spring-wound clutches, a plurality of permanent magnets are fixed on the armature plate by a binding agent. The durability of the armature plate with magnets mounted in this manner is greatly diminished, however, because the impact force generated by attraction of the armature plate to the output member directly acts on the permanent magnets. Thus, there is a tendency for the permanent magnets to become dislodged from the armature plate over time. Moreover, abrasive dust particles which form due to friction between the wound spring and the output member and the armature plate and output member are attracted to the permanent magnets. If some of the dust particles settle between the cover plate covering the assembly and armature plate, the predetermined axial gap between the armature plate and output member is decreased. Thus, the armature plate may contact the output member without operation of the electromagnetic clutch. When this occurs, the armature plate is subject to an abnormally high rate of wear.

SUMMARY OF THE INVENTION

It is an object of the present invention to provide an electromagnetic spring-wound clutch having improved reliability over such clutches known in the prior art.

It is another object of the present invention to provide an electromagnetic spring-wound clutch having improved durability over such clutches known in the prior art.

It is still another object of the present invention to provide an electromagnetic spring-wound clutch which accomplishes the above objectives while at the same time being simple in construction.

The electromagnetic spring-wound clutch in accordance with the present invention comprises a first rotatable member having an axial end plate formed of magnetic material and a second rotatable member coaxially disposed with respect to the first rotatable member. An armature plate is disposed coaxially with respect to the first rotatable member and is frictionally engagable with the first rotatable member. A coil-wound spring is positioned around the first rotatable member and is connected at its respective ends to the second rotatable member and the armature plate. A cover plate is fixed to the second rotatable member and covers the outer peripheral surface of the coil-wound spring. An electromagnetic means associated with the first rotatable member is provided for attracting the armature plate member to the axial end plate of the first rotatable member so that the rotative motion of this member is transmitted to the second rotatable member through the armature plate and coil-wound spring by operation of the electromagnetic means. A guide member is also disposed on the outer peripheral portion of the cover plate. The armature plate member is connected to the guide member through a plurality of leaf springs which maintain a predetermined axial air gap between the armature plate and the first rotatable member.

Further objects, features and other aspects of the present invention will be understood from the detailed description of the preferred embodiment of the invention with reference to the annexed drawings.

DETAILED DESCRIPTION OF THE PREFERRED EMBODIMENTS

Figure 1:
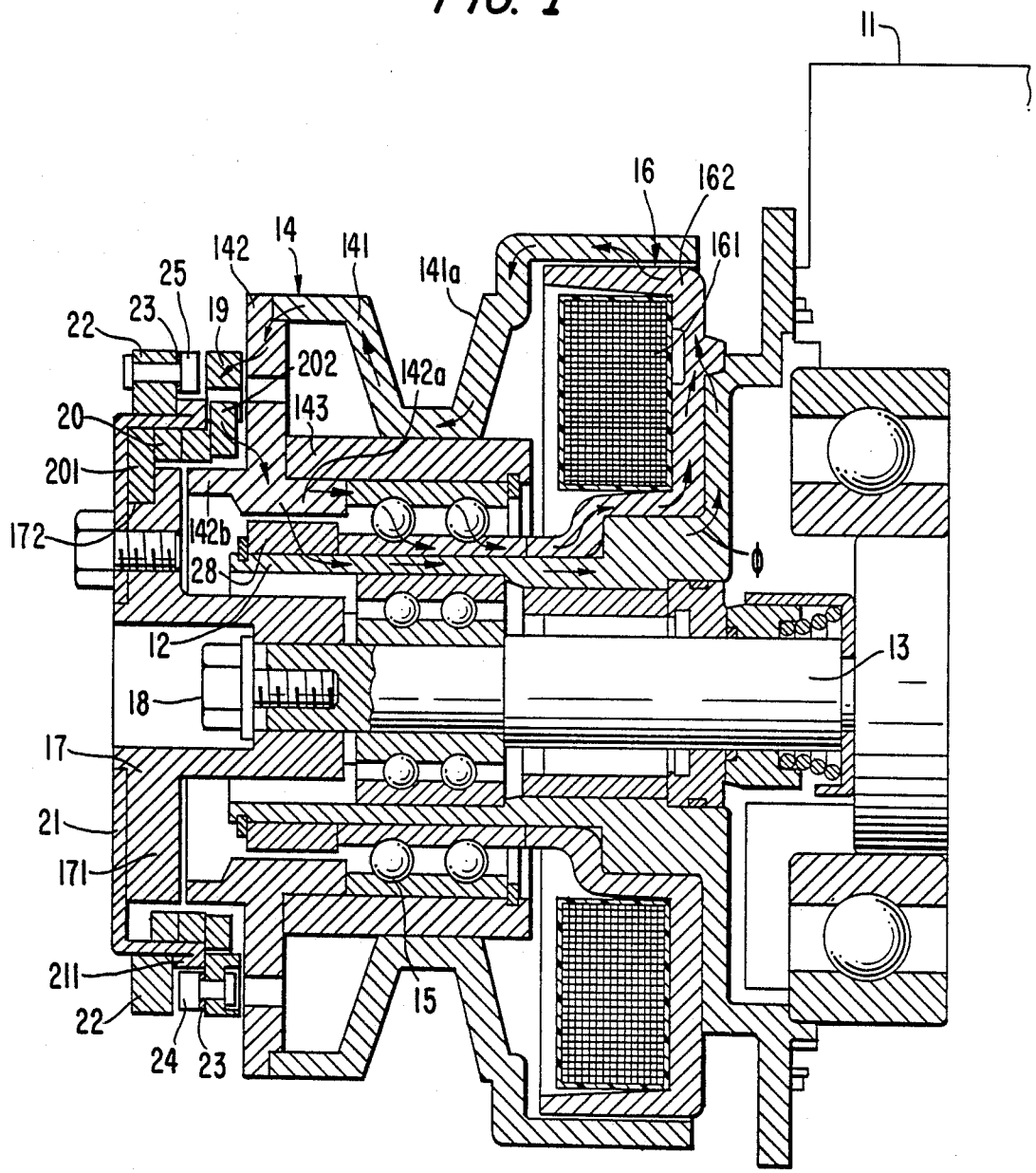
FIG. 1 is a vertical cross sectional view of an electromagnetic clutch in accordance with the present invention.

With reference to FIG. 1, an electromagnetic clutch according to the present invention is shown assembled on a compressor for an automobile air conditioning system. Compressor housing 11 is provided with a cantilevered tubular extension 12 surrounding drive shaft 13 of the compressor. Drive shaft 13 is rotatably supported in compressor housing 11 by bearings.

A pulley 14, which has an axial end plate portion 142, is rotatably supported on tubular extension 12 by bearings 15 which are mounted on the outer peripheral surface of tubular extension 12. Electromagnetic means 16 comprising a magnetic coil 161 and a coil housing 162 is disposed on tubular extension 12 and fixed to compressor housing 11. A hub 17 is disposed on an outer terminal end of drive shaft 13. Hub 17 is secured to drive shaft 13 by bolt 18 and has a radial flange portion 171 extending radially outwardly to face axial end plate portion 142 of pulley 14 with a predetermined axial gap. An armature plate 19 is disposed between axial end plate portion 142 of pulley 14 and a radial flange portion 171 of hub 17 in a position concentric with hub 17. Armature plate 19, which faces axial end plate portion 142 of pulley 14 at a predetermined axial gap, is moveably connected to flange portion 171 of hub 17 through a coil-wound spring 20. End portion 201 of coil-wound spring 20 is hooked on a recess 172 formed on the outer peripheral portion of flange portion 171 of hub 17. End 202 of coil-wound spring 20 is hooked on an inner peripheral surface of armature plate 19. A spring cover 21 is attached to the outer end surface of flange portion 171 of hub 17 to cover coil-wound spring 20.

Pulley 14 comprises outer cylindrical member 141 which has a V-shaped groove 141a for receiving a V-belt in engagement with the engine of the automobile. Pulley 14 also includes axial end plate portion 142 extending radially inwardly from an end portion of outer cylindrical member 141. The inner end of end plate portion 142 has an inner axial flange 142a and an outer axial flange 142b axially projecting therefrom in T-shaped cross-section. Flanges 142a and 142b extend along spacer 28 disposed on tubular extension 12 to prevent the axial movement of bearings 15. The outer peripheral surface of axial flange 142b faces the inner peripheral surface of coil-wound spring 20 with a small air gap therebetween. An annular shaped non-magnetic material member 143 is placed between the inner peripheral surface of cylindrical member 141 and the outer surface of the outer races holding bearings 15 for rotatably supporting pulley 14 on bearings 15 and to prevent a leakage or short circuit path of magnetic flux through the open space of pulley 14. Non-magnetic material member 143 is fixed on the inner peripheral surface of outer cylindrical member 141. The outer races which hold bearings 15 are located between the axial end surface of axial flange 142 of pulley 14 and snap ring 34, disposed on an inner peripheral surface of non-magnetic material member 143, to thereby prevent the axial movement of bearings 15.

Figure 3:
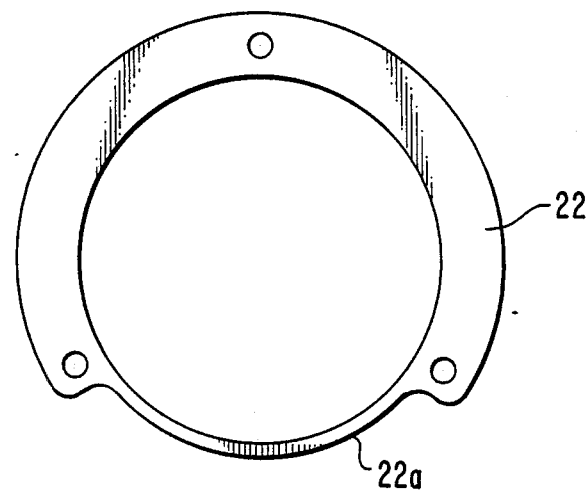
FIG. 3 is front view of the guide members for the armature plate of the electromagnetic clutch shown in FIG. 1.

Spring cover 21 has a bent portion 211 at its outer terminal end. Armature plate 19 is disposed on an outer peripheral portion of spring 20 for securing the axial end surface to the axial end portion of bent portion 211. An annular guide member 22, shown in more detail in FIG. 3, is fitted on the outer peripheral surface of spring cover 21 and is rotatble with respect thereto. The axial end surface of guide member 22 is fitted on the axial end portion of bent portion 211 of spring cover 21 to maintain its axial position.

Figure 2:
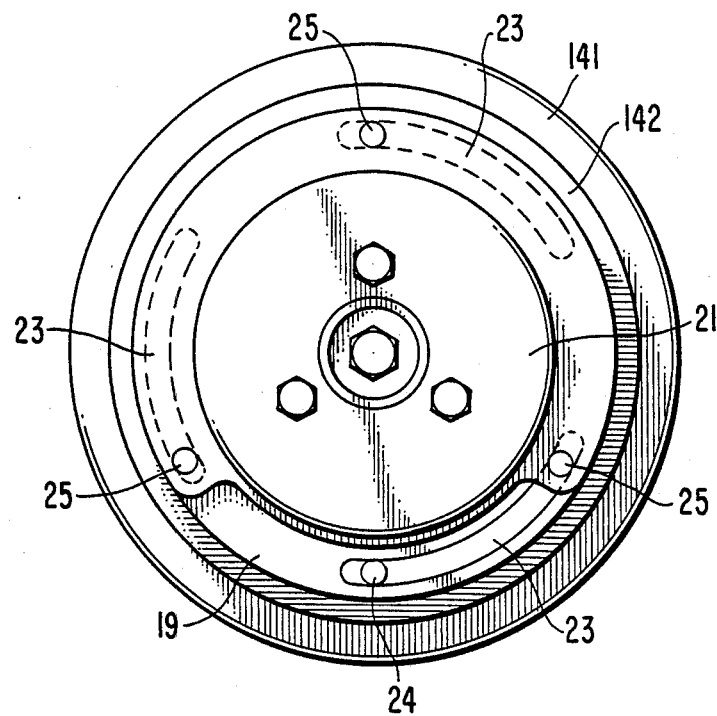
FIG. 2 is front view of the electromagnetic clutch shown in FIG. 1.

Armature plate 19 is connected to guide member 22 through a plurality of arc-shaped leaf springs 23. As shown in FIG. 2, one end of each of leaf springs 23 is fixed on armature plate 19 by rivet 24 and the other end is fixed on guide member 22 by rivet 25. Therefore, armature plate 19 is normally pressed against bent portion 211 of spring cover 21 by the spring bias of leaf springs 23.

When coil 161 is energized, magnetic flux is produced and flows as indicated by arrows 29 around a closed loop. The magnetic flux passes through outer cylindrical member 141 of pulley 14, axial end plate portion 142, armature plate 19 and end 202 of coil wound-spring 20. From end 202, the magnetic flux passes through axial flanges 142a and 142b of pulley 14. The flow of magnetic flux flow then separates into two paths as shown by arrows 29. One path passes through spacer 28 and tubular extension 12. The other path passes through the inner and outer races holding bearings 15 and tubular extension 12. A leakage or short circuit path across outer cylindrical member 141 to flange 142a or the races holding bearings 15 is prevented by non-magnetic material member 143.

Armature plate 19 is magnetically attracted to pulley 14 by the above mentioned magnetic flux when coil 161 is energized. Thus, armature plate 19 is brought into frictional engagement with axial end plate portion 142 of pulley 14 and rotates together with pulley 14. An end portion of coil-wound spring 20 is also rotated together with armature plate 19. With guide member 22 rotatable with respect to spring cover plate 21, coil-wound spring 20 thus winds into secure contact around outer axial flange 142b of pulley 14. Therefore, the rotating motion of the automotive engine is transmitted to drive shaft 13 of the compressor through pulley 14, armature plate 19, coil-wound spring 20, leaf-springs 23 and hub 17.

When coil 161 is de-energized, magnetic flux is no longer produced. Thus, armature plate 19 is separated from axial end plate portion 142 of pulley 14 and is returned to a position against bent portion 211 of spring cover 21 by the bias strength of leaf-springs 23. Coil-wound spring 20 also unwinds from flange portion 142b to interrupt the transmission of rotating motion from the automotive engine to the drive shaft of the compressor.

As discued above, the electromagnetic spring-wound clutch in accordance with the present invention comprises a pulley for transmitting the rotating motion of the automobile engine or external power source to the drive shaft, and a hub which is fixed on the outer terminal end of the drive shaft and is flexibly connected to the armature plate. A coil-wound spring is placed on an end portion of the pulley and is connected at its respective ends to the hub and armature plate. A cover plate is disposed on the hub for covering the coil-wound spring and a guide member is placed on the cover plate in a manner to enable rotating movement around the cover plate. The guide member is connected to the armature plate through a plurality of leaf springs which maintain an axial air gap therebetween. Therefore, the movement of the armature plate can be easily controlled and the predetermined gap can be readily maintained. Moreover, a more durable and reliable clutch is provided in accordance with the construction of the present invention.

The present invention has been described in detail in connection with a preferred embodiment. The embodiment, however, is merely an example and the invention is not restricted thereto. It will be understood by those skilled in the art from a reading of the specification that variations and modification can be made within the scope of the present invention as defined by the appended claims.

We claim:

1. In an electromagnetic spring-wound clutch including a first rotatable member having an axial end plate of magnetic material, a second rotatable member coaxially positioned with respect to said first rotatable member, an armature plate member coaxially postioned with respect to said first rotatable member and frictionally engageable therewith, a coil-wound spring wound around said first rotatable member and being connected at its respective ends to said second rotatable member and said armature plate member, a cover plate fixed to said second rotatable member and covering the outer peripheral surfaceof said coil-wound spring, and electromagnetic means associated with said axial end plate of said first rotatable member for attracting said armature plate member to said axial end plate so that rotation of said first rotatable member is transmitted to said second rotatable member through said armature plate member and said coil-wound spring by the operation of said electromagnetic means, the improvement comprising an inelastic guide member disposed on said cover plate and coaxially rotatable with said first rotatable member, said armature plate member being connected to said guide member by a plurality of leaf springs to maintain a predetermined axial air gap between said axial end plate of said first rotatable member and said armature plate member wherein said guide member is rotatable with respect to said cover plate.

2. The electromagnetic spring-wound clutch of claim 1 wherein said cover plate has a bent portion at an axial terminal end and said guide member is fitted on a first axial end portion of said bent portion.

3. The electromagnetic spring-wound clutch of claim 2 wherein said armature plate member is fitted on a second axial end portion of said bent portion in response to the bias strength of said leaf springs when said electromagnetic means is not operated.

4. An electromagnetic spring-wound clutch comprising:
- a first rotatable member having a frictional axial end surface formed of magnetic material;
- a second rotatable member coaxially positioned with respect to said first rotatable member;
- an armature plate member coaxially positioned with respect to said first rotatable member and frictionally engageable with said first rotatable member;
- a coil-wound spring wound around said first rotatable member and being connected at its respective ends to said second rotatable member and said armature plate member, respectively;
- a cover plate fixed to said second rotatable member to cover the outer peripheral surface of said coil-wound spring and having a bent portion at an outer terminal end portion thereof;
- electromagnetic means associated with said axial end surface of said first rotatable member for attracting said armature plate member to said axial end surface so that rotation of said first rotatable member can be transmitted to said second rotatable member through said armature plate member and said coil-wound spring;
- an inelastic guide member rotatably disposed on an outer peripheral surface of said cover plate and fitted against one axial end of said bent portion to maintain an axial position thereof; and
- a plurality of leaf springs positioned between said armature plate member and said guide member and connected therebetween.

* * * * *